United States Patent
Li et al.

(10) Patent No.: US 12,070,676 B2
(45) Date of Patent: Aug. 27, 2024

(54) PROCESS OF MANUFACTURING SKIING EQUIPMENT USING A HIGH-ENTROPY ALLOY

(71) Applicant: DONGGUAN REVOLUTION PRODUCT DESIGN CO., LTD., Guangdong (CN)

(72) Inventors: Yeung Tak Lugee Li, Hongkong (HK); Ailian Pang, Guangdong (CN)

(73) Assignee: DONGGUAN REVOLUTION PRODUCT DESIGN CO., LTD., Dongguan (CN)

( * ) Notice: Subject to any disclaimer, the term of this patent is extended or adjusted under 35 U.S.C. 154(b) by 446 days.

(21) Appl. No.: 17/336,468

(22) Filed: Jun. 2, 2021

(65) Prior Publication Data

US 2022/0219068 A1 Jul. 14, 2022

(30) Foreign Application Priority Data

Jan. 8, 2021 (CN) .......................... 202110029250.8

(51) Int. Cl.
*C22C 30/00* (2006.01)
*A63C 1/42* (2006.01)
*A63C 5/056* (2006.01)
*C22C 30/02* (2006.01)

(52) U.S. Cl.
CPC ................ *A63C 5/056* (2013.01); *A63C 1/42* (2013.01); *C22C 30/00* (2013.01); *C22C 30/02* (2013.01)

(58) Field of Classification Search
CPC ...................................................... C22C 30/00
See application file for complete search history.

(56) References Cited

U.S. PATENT DOCUMENTS 6,843,496 B2 * 1/2005 Peker ...................... B32B 27/00
280/610

FOREIGN PATENT DOCUMENTS

| CN | 104862510 A | 8/2015 |
| CN | 107349595 A | 11/2017 |
| DE | 299901 A7 | 5/1992 |
| FR | 937394 A | 8/1948 |
| WO | 2005084763 A1 | 9/2005 |

OTHER PUBLICATIONS

Bäurle, L. (2006). Sliding friction of polyethylene on snow and ice (Doctoral dissertation, ETH Zurich).*
"Microstructure and tribological properties of plasma sprayed FeCoNiCrSiAl, high entropy alloy coatings", Wear, Elsevier Sequoia, Lausanne, CH, vol. 448, Jan. 28, 2020 (Jan. 28, 2020).

* cited by examiner

*Primary Examiner* — Christopher S Kessler
(74) *Attorney, Agent, or Firm* — SHIMOKAJI IP

(57) ABSTRACT

The present invention relates to a process of manufacturing skiing equipment using a high-entropy alloy, especially manufacturing for a bottom member of a ski, a blade of an ice skate shoe or the bottom member of a skiing vehicle. The high-entropy alloy is used to prepare skiing equipment, so that the skiing equipment has a small friction coefficient, obtains good speed, and can be driven with less energy, which realizes energy-saving effect.

9 Claims, No Drawings

PROCESS OF MANUFACTURING SKIING EQUIPMENT USING A HIGH-ENTROPY ALLOY

RELATED APPLICATIONS

This application claims the benefit of priority to Chinese Patent Application No. 202110029250.8 filed in Jan. 8, 2021, which is hereby incorporated by reference in its entirety.

FIELD OF THE INVENTION

The present invention relates to the application field of high-entropy alloy material, more particularly to the process of manufacturing skiing equipment using a high-entropy alloy.

BACKGROUND OF THE INVENTION

With the improvement of people's living standards, more and more young people will try and like outdoor sports, such as skating, skateboarding, skiing, etc., which can build their bodies and achieve good social purposes. Among these outdoor sports, skiing has very high requirements for people and venues and attracts more and more young people.

Skis are equipment that must be used in skiing. Skis generally include the skis for alpine skiing, cross-country biathlon skiing, ski jumping, freestyle skiing, and snowboarding. Generally, the ski includes a bottom member which is arranged under a ski body and contacts the snow surface. The bottom member not only need high wear resistance, but also a low coefficient of friction. At present, most of the bottom members are made of plastic or wood materials, and there are two preparation methods, for example the injection molding or the extrusion moulding. The bottom member prepared by the injection molding has a long life and is easy to repair, but the ski made by the injection molding has lesser amount of waxing and a slower speed. The ski prepared by the extrusion moulding is stronger, faster, and better waxed than the ski prepared by the injection molding, but the preparation process is complicated, expensive, and not suitable for maintenance.

In 2004, researchers put forward a new alloy, that is, high-entropy alloy with multi-principal elements. That is, a variety of elements are the main element, and there are five or more main elements. Atomic percentage of each main element is between 5 and 35%, and any element does not exceed 50% in atomic percentage and becomes the main element. High-entropy alloy has some excellent properties that traditional alloy cannot match, such as high strength, high hardness, high wear and corrosion resistance, high thermal resistance, high resistance, etc., and the high-entropy alloy is often used in electronic materials. However, inventor has found that when the high-entropy alloy is used for vehicles such as skis, the skis obtain super-good speed and require less energy to drive, which will save energy, and under the low temperature environment, high-entropy alloy material still has better strength, so the high-entropy alloy has broad application prospects in skiing equipment.

SUMMARY OF THE INVENTION

The present invention provides a process of manufacturing skiing equipment using a high-entropy alloy.

Preferably, the skiing equipment includes an equipment body and a bottom member disposed on the bottom of the equipment body, and the bottom member is made of the high-entropy alloy.

Concretely, the skiing equipment is a ski, and the bottom member of the ski is made of the high-entropy alloy.

Concretely, the skiing equipment is ice skate shoes, and a blade of the ice skate shoe is made of the high-entropy alloy.

Concretely, the skiing equipment is a skiing vehicle, and the bottom member of the skiing vehicle is made of the high-entropy alloy.

Preferably, the high-entropy alloy is AlNiCuZrFeCr and its high-entropy alloy thereof, or AlCoCrFeNi and high-entropy alloy thereof.

Concretely, the high-entropy alloy is the as-cast high-entropy alloy, the single-crystal high-entropy alloy, or the high-entropy alloy in a fiber plate form. More specifically, when the high-entropy alloy in a fiber plate form is used in skiing equipment, the skiing equipment can be easily bent and further rolled up without any mechanical damage, and the high-entropy alloy in a fiber plate form alloy is particularly suitable for the bottom member having an arched structure, which not only has a good friction coefficient, but also has excellent flexibility and processing performance. It is easy to form the arched structure, reduce costs, and improve the quality of the bottom member.

The technical solutions have the following technical effects.

1. High-entropy alloy is used to prepare skiing equipment, so that the skiing equipment has a small friction coefficient, exhibits super-good speed, and can be driven with less energy, which obtains energy-saving effect.
2. Skiing equipment is used in a low temperature environment. In a low temperature environment, the strength of high-entropy alloy material is better, thereby improving the wear resistance and crash resistance of skiing equipment.
3. When the fiber-state high-entropy alloy is used in skiing equipment, the skiing equipment can be easily bent and further rolled up without any mechanical damage, and the high-entropy alloy in a fiber plate form is particularly suitable for the bottom member having an arched structure, which not only has a good friction coefficient, but also has excellent flexibility and processing performance. It is easy to form the arched structure, reduce costs, and improve the quality of the bottom member.

DETAILED DESCRIPTION OF ILLUSTRATED EMBODIMENTS

The present invention will be described with reference to the specific embodiments.

The present invention discloses the application of the high-entropy alloy in skiing equipment. The skiing equipment made of the high-entropy alloy can increase its sliding speed in the snow, and has high strength and reduces maintenance costs. Moreover, due to better toughness of the high-entropy alloy, the processing technology of the skiing equipment is simpler. Preferably, the skiing equipment includes an equipment body and a bottom member disposed on the bottom of the equipment body, and a high-entropy alloy is used for manufacturing the bottom member of the skiing equipment. The bottom member refers to the part in contact with the snow. The bottom member made of the high-entropy alloy is only arranged at the bottom of the equipment body, which not only achieves the above-mentioned excellent effects, but also effectively saves high-entropy alloy material.

The skiing equipment may be, but is not limited to, skis, ice skate shoes, and skiing vehicles that can slide on snow. In one embodiment, the high-entropy alloy is used for the bottom member of the ski by preparing a plate structure, and the thickness of the plate structure may be, but not limited to, 0.5 mm-1.5 mm. In another embodiment, the high-entropy alloy is used for a blade of the ice skate shoe. In other embodiments, the high-entropy alloy is used for a bottom member of the ski vehicle.

The high-entropy alloy may be, but is not limited to, AlNiCuZrFeCr and its high-entropy alloy, or AlCoCrFeNi and its high-entropy alloy. Further, the high-entropy alloy is the as-cast high-entropy alloy, the single-crystal high-entropy alloy, or the high-entropy alloy in a fiber plate form. The inventor found that when the high-entropy alloy in a fiber plate form is used in skiing equipment, the skiing equipment can be easily bent and further rolled up without any mechanical damage, and the high-entropy alloy in a fiber plate form is particularly suitable for the bottom member having an arched structure, which not only has a good friction coefficient, but also has excellent flexibility and processing performance. It is easy to form the arched structure, reduce costs, and improve the quality of the bottom member.

The following embodiments are for further describing the process of manufacturing skiing equipment using a high-entropy alloy.

EXAMPLE 1

A ski is prepared. The ski includes an equipment body, a bottom member, and a ski core located between the equipment body and the bottom member, and the bottom member is arranged below the ski core. The bottom member is made of $Al_{0.3}CoCrFeNi$ high-entropy alloy and the thickness of the bottom member is 1 mm.

EXAMPLE 2

An ice skate shoe is prepared. The ice skate shoe includes a shoe body and a blade located at the bottom of the shoe body. The ice skate shoe is made of $Al_{0.3}CoCrFeNi$ high-entropy alloy.

Comparative Example 1

The ski is prepared. The ski includes an equipment body, a bottom member, and a ski core located between the equipment body and the bottom member, and the bottom member is arranged below the ski core. The bottom member is made of wood by extrusion and the thickness of the bottom member is 1 mm.

Comparative Example 2

The ice skate shoe is prepared. The ice skate shoe includes a shoe body and a blade located at the bottom of the shoe body. The ice skate shoe is made of stainless steel.

The friction coefficients of the skis and ice skate shoes in Examples 1-2 and Comparative Examples 1-2 at temperatures of −5° C., −10° C. and −15° C. were tested, as shown in Table 1.

TABLE 1

| Examples | Friction coefficient (−5° C.) | Friction coefficient (−10° C.) | Friction coefficient (−15° C.) |
|---|---|---|---|
| Example 1 | 0.042 | 0.040 | 0.039 |
| Example 2 | 0.035 | 0.033 | 0.032 |
| Comparative Example 1 | 0.113 | 0.110 | 0.118 |
| Comparative Example 2 | 0.107 | 0.106 | 0.109 |

It can be seen from the Table 1 that the present invention uses the high-entropy alloy to prepare skiing equipment, and friction coefficients of the Examples 1-2 are less than that of Comparative Examples 1-2. Therefore, the use of high-entropy alloy in skiing equipment can make the skiing equipment have a smaller friction coefficient and obtain better speed, so the skiing equipment can be driven with less energy and can save energy. Furthermore, as the temperature decreases, the friction coefficient does not increase but decreases. High-entropy alloy has broad application prospects in skiing equipment.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method of manufacturing skiing equipment, comprising forming the skiing equipment by using a high-entropy alloy, wherein each metal in the high-entropy alloy does not exceed 50% in atomic percentage, a friction coefficient of the skiing equipment decreases with a decrease of temperature, in a temperature range of −5° C. to −15° C., the friction coefficient of the skiing equipment is 0.042 to 0.039, the friction coefficient of the skiing equipment at −5° C. is 0.042, the friction coefficient of the skiing equipment at −10° C. is 0.040, and the friction coefficient of the skiing equipment at −15° C. is 0.039.

2. The method according to claim 1, wherein the skiing equipment comprises an equipment body and a bottom member disposed on the bottom of the equipment body, and the bottom member is made of the high-entropy alloy.

3. The method according to claim 2, wherein the skiing equipment is a ski, and the bottom member of the ski is made of the high-entropy alloy.

4. The method according to claim 1, wherein the skiing equipment is a skiing vehicle, and the bottom member of the skiing vehicle is made of the high-entropy alloy.

5. The method according to claim 1, wherein the high-entropy alloy is an as-cast high-entropy alloy, a single-crystal high-entropy alloy, or a high-entropy alloy in a fiber plate form.

6. The method according to claim 2, wherein the high-entropy alloy is an as-cast high-entropy alloy, a single-crystal high-entropy alloy, or a high-entropy alloy in a fiber plate form.

7. The method according to claim 3, wherein the high-entropy alloy is an as-cast high-entropy alloy, a single-crystal high-entropy alloy, or a high-entropy alloy in a fiber plate form.

8. The method according to claim 4, wherein the high-entropy alloy is an as-cast high-entropy alloy, a single-crystal high-entropy alloy, or a high-entropy alloy in a fiber plate form.

9. A method of manufacturing a blade of an ice skate shoe, comprising forming the blade by using a high-entropy alloy, wherein each metal in the high-entropy alloy does not exceed 50% in atomic percentage, a friction coefficient of the blade decreases with a decrease of temperature, in a temperature range of −5° C. to −15° C., the friction coefficient of the blade is 0.035 to 0.032, the friction coefficient of the blade at −5° C. is 0.035, the friction coefficient of the blade at −10° C. is 0.033, and the friction coefficient of the blade at −15° C. is 0.032.

* * * * *